May 18, 1965
H. U. GARRETT
3,183,921
GAS LIFT VALVES
Filed April 3, 1963
2 Sheets-Sheet 1
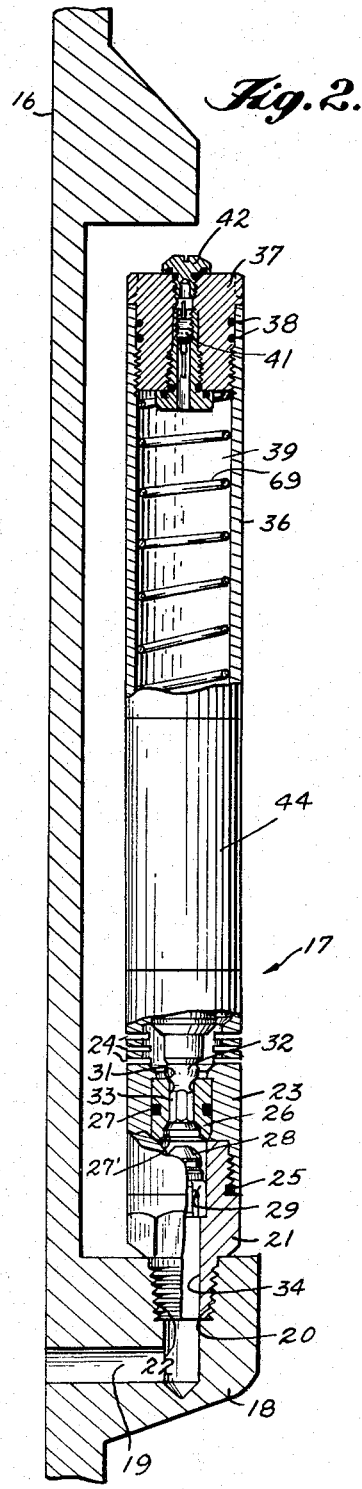
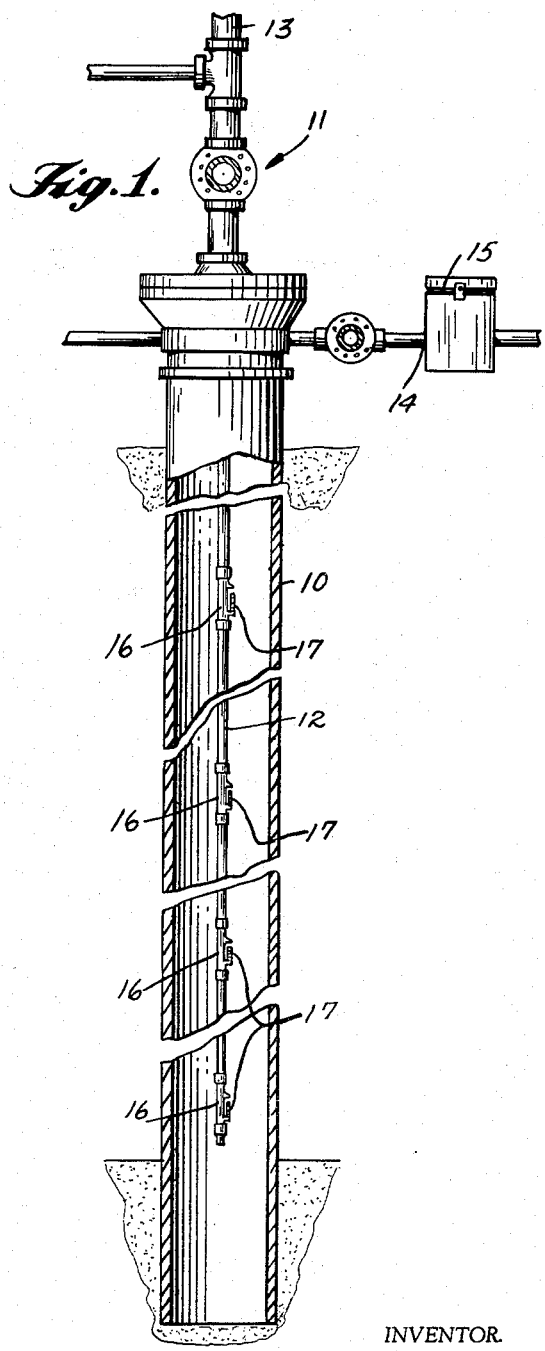
INVENTOR.
H. U. GARRETT
BY
ATTORNEYS May 18, 1965

H. U. GARRETT 3,183,921

GAS LIFT VALVES

Filed April 3, 1963

H. U. Garrett
INVENTOR.

BY
ATTORNEYS

United States Patent Office 3,183,921
Patented May 18, 1965

3,183,921
GAS LIFT VALVES
Henry U. Garrett, Longview, Tex., assignor to Udell, Inc., Longview, Tex., a corporation of Texas
Filed Apr. 3, 1963, Ser. No. 270,372
11 Claims. (Cl. 137—155)

This invention relates to pressure responsive valves and more particularly it relates to gas lift valves for oil wells.

One well known form of gas lift valve employs a pressure-charged dome and bellows, or other type of pressure-responsive barrier, to control opening and closing of the valve. As the pressure charge and bottom hole pressure in the well may both be several thousand pounds, protection of the very sensitive bellows has historically been a problem. As the dome is charged at the surface, the bellows should be protected against excessive differential in both directions.

Another problem has been the control of the spread between opening and closing pressure of the valve, particularly where the area of the valve member exposed to casing pressure remains substantially constant in all positions.

A principal object of the present invention is therefore to provide a pressure-responsive valve of the type having particular utility in gas-lift oil well production techniques and by which the above-identified problems are substantially and effectively overcome.

Another object of this invention is to provide an improved pressure-responsive valve of the type employing a pressure dome and a pressure-sensitive barrier device such as a bellows, which valve may be employed in all phases of gas-lift production operations without danger of subjecting the bellows to pressures at which it could be permanently deformed or set.

A further object of this invention is to provide an improved pressure-responsive valve of the type referred to having utility both as an unloading valve and a working valve in a gas-lift operation without danger of damage to the bellows resulting from high pressure differentials whether the differential be caused by high dome pressures or high casing pressures.

Another object of this invention is the provision of a bellows protection device in valves of the type referred to whereby extremely sensitive bellows diaphragm, packing or other type pressure barrier may be employed under conditions in which exceedingly high pressure differentials are incurred.

A still further object of this invention is to provide an improved pressure-responsive valve of the type incorporating a pressure dome and a pressure-sensitive barrier device by which improved characteristics in the spread between the pressures at which the valve is opened and closed are achieved.

Other objects and further scope of applicability of the present invention will become apparent from the following description taken in conjunction with the drawings, wherein like reference numerals designate like parts and in which:

FIGURE 1 is a schematic cross-sectional view illustrating an oil well equipped with the pressure-responsive valves according to this invention;

FIGURE 2 is an enlarged fragmentary cross-sectional view of a preferred form of the pressure-responsive valve to which the present invention is directed, and showing in more detail the manner in which it is attached to the well tubing string illustrated in FIGURE 1;

Figure 4:
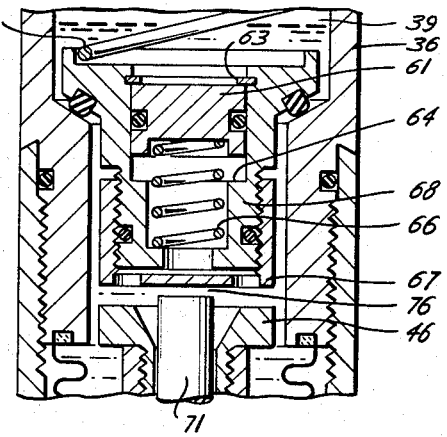
FIGURE 4 is an enlarged fragmentary cross-sectional view exaggerating the clearance between the one-way valve and the mechanical lifting stem.

Referring now to the drawings, and particularly to FIGURE 1 thereof, a well bore is illustrated and equipped with a casing 10 and a conventional well head 11 at ground surface. A string of flow tubing 12 extends within the casing and is provided at its upper end with suitable flow connections 13. A gas pressure line 14 equipped with a controller 15 is connected at the well head 11 to communicate with the annulus between the tubing string 12 and casing 10. The tubing string 12 is provided at intervals along its length with mandrels 16 to which the pressure-responsive valves 17 of this invention are connected.

As shown in FIGURE 2, the mandrels 16 are each provided with a laterally extending boss 18 having a bore 19 in communication at one end with the tubing string and terminating at its other end in an internally threaded portion 20. Each of the pressure-responsive valves 17 includes a hollow, multi-part housing terminating at its lower end in an adapter 21 having an externally threaded portion 22 received within the threaded portion 20 of the boss 18. A main valve housing part 23 having inlet ports 24 is threaded and suitably sealed such as by an O-ring 25 to the adapter 21. Within the housing part 23 is cylindrical seating ring 26 provided with an O-ring seal 27. The lower end of the seating ring 26 is provided with a seating face 27a for a check valve 28 supported for sliding movement with respect to a spider 29 within the adapter 21. The upper end of the seating ring 26 defines a line seat 31 for a main valve 32 having a fluted guide portion 33 extending within the seating ring 26. The remaining portion of the main valve will be described in more detail hereinafter, but it may now be understood that upon the main valve 32 becoming unseated from the seat 31, fluid in the vicinity of the inlet ports 24 will be placed in communication with the interior of the tubing string 12 by way of an outlet port 34 in the hollow adapter 21. The check valve 28 serves to prevent back flow of fluid from the tubing through the valve.

Situated at the upper end of the valve 17 is a housing part 36 to which an end plug 37 is threadably secured and sealed by O-rings 38 to establish a sealed pressure dome 39. The end plug 37 is provided with a conventional inflation valve 41 and is adapted to receive a sealing cap 42 to assure against leakage of compressed gas from the pressure dome 39 through the valve 41. The dome 39, in use, will contain an expansible fluid or gas under pressure in amounts which will be determinative of well casing pressure at the inlet ports 24 required to lift the main valve 32 from its seat 31.

Figure 3:
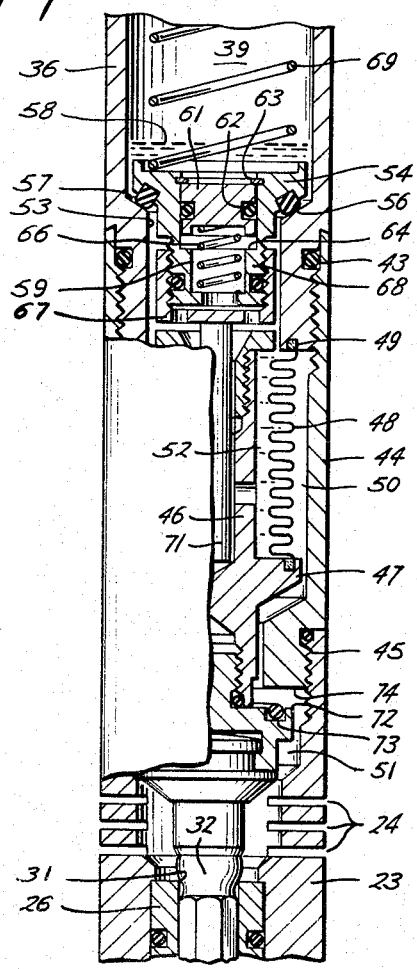
FIGURE 3 is an enlarged fragmentary cross-sectional view illustrating the principal actuating components of the valve shown in FIGURE 2.

A more complete understanding of one form of the actuating mechanism by which this function is served will be had by reference to FIGURE 3 of the drawings. As shown, the dome housing part 36 is threadably received and sealed by an O-ring 43 in a bellows housing part 44, in turn connected by threads 45 to the upper end of the main valve housing part 23. Also, it will be seen that the main valve 32 is provided with an upstanding bellows guide portion 46 having an annular shoulder 47 formed thereon. A pressure-transmitting barrier device in the form of a distensible bellows 48 extends between and is in sealing engagement with the shoulder 47 on the main valve and the lower end 49 of the dome housing part 36 to define a first chamber 50 in communication with well casing fluid (in the form shown) by way of a passage 51 and the inlet ports 24. A second chamber 52 is established within the bellows and adapted to be placed in communication by way of a passageway 53 with the pressure dome 39. Hence, it will be seen that when the chamber 52 is in communication with the pressure dome 39, the pressure at which the dome is loaded operates to seat the main valve 32. Correspondingly, well casing pressure being in communication with the chamber 50 through the inlet ports 24 and passage 51 will be effective to oppose the seating pressure exerted by the pressure dome and lift the main valve 32 from its seat 31.

An important feature of the present invention resides in the provision of means for protecting the bellows 48 from extreme pressure differentials, which would cause distortion to an amount at which the bellows would take a permanent set. To illustrate, it may be desirable to load the pressure dome with pressures up to and possibly in excess of 2000 p.s.i. Since the dome must be loaded at the surface before the tubing string 12 and valves 17 are introduced into the casing, the pressure in the chamber 50 will be substantially atmospheric, thereby imposing the full dome pressure on the bellows 48 to create a pressure differential which would result in a permanent set in the bellows. To protect the bellows from such extremely high pressure differentials, a one-way valve 54 provided with a seating seal 56 is positioned in the passage 53 and seatable in the direction of the bellows chamber 52 against a seat 57 formed near the lower end of the dome housing part 36. Also, the chamber 52 within the bellows, the passageway 53, and the lower portion of the pressure dome 39 are filled with liquid 58.

The preferred structure of the valve 54 is shown in FIGURES 3 and 4 to include a central bore 59 within which a piston 61 having an O-ring seal 62 is slidably positioned for movement between an upper limit established by a snap ring 63 and a lower limit established by a shoulder 64. A small spring 66 is provided to bias the piston 61 upwardly against the snap ring 63. The length of the valve 54 extending below the seat 57 is rendered adjustable for reasons which will become more apparent from the description following below by an apertured cap 67 threadably engaging a depending portion 68 of the valve 54. The valve 54 is adapted to be mechanically seated by a compression spring 69 within the pressure dome 39 and to be hydraulically unseated. The valve 59 is prevented from reseating prior to closing of the main valve 32 by engagement with a stem 71 projecting from within the main valve bellows guide portion 46.

Because casing pressures used in gas-lift operations will often exceed the fluid pressure within the dome 39 after the main valve 32 is fully opened, and thereby subject the bellow to pressure differentials which again might cause the bellows to take on a permanent set, the present invention embodies as another important feature, means for isolating the chamber 50 between the bellows 48 and the housing part 44 from extremely high well casing pressures. A preferred structure for affording such means is illustated in FIGURE 3 and includes an auxiliary valve portion in the passage 51 in hte form of an upwardly facing annular ledge 72 formed on the main valve member 32. A sealing ring 73 is provided in the ledge 72 and is adapted to make sealing contact with a downwardly facing seat 74 provided on the lower end of the bellows housing part 44. Thus, it will be seen that when the valve 32 is lifted from its seat 31 to a fully opened position, the sealing ring 73 moves into engagement with the seat 74 to isolate the chamber 50 from the inlet ports 24 by closing the passage 51. Correspondingly, the bellows is isolated from exceedingly high pressures which may exist within the well casing 10.

The operation of the valve 17 as illustrated in FIGURES 2 and 3 may now be understood when employed either as an unloading valve or a working valve in the conventional gas-lift method of producing wells.

Before the tubing string 12 having the valves 17 attached thereto in the manner illustrated in FIGURES 1 and 2 of the drawings is run into the well casing 10, the chamber 52 is filled with a liquid. This may be accomplished either by holding the one-way valve 54 off its seat to permit liquid to pass and fill the bellows 48 or by filling the bellows with liquid before the valve 54 is placed into the dome 39. The level of liquid should be sufficient so as to completely fill and exclude all air between the bellows 48 and the seating ring 56 on the valve 54. Preferably, the liquid should be at a level so as to extend into the pressure dome 39; however, as will be understood by those skilled in the art, the level should not be at such a height within the dome 39 so as to materially reduce the volume thereof. After the valve 54, the spring 69 and the end plug 37 with its associated inflation valve 41 are in the position illustrated in FIGURES 2 and 3, the pressure dome is inflated with air or other expansible fluid to a pressure such that the valve will open when the desired casing pressure is reached. For purposes of illustration, a dome pressure of 2000 p.s.i. may be assumed. After so charging the dome 39, the cap 42 is inserted to assure against pressure loss through the inflation valve 41. The spring 69 initially seats the valve 54 so that upon charging the dome 39 as aforesaid, the valve 54 is held against the seat 57 with a force developed by the charging pressure acting over the area established by the seating ring 56. Also, with the apertured cap 67 adjusted to the position shown in FIGURE 3 of the drawings, only a negligible amount of play or clearance exists between the base of the valve 54 and the stem 71 mechanically associated with the main valve 32. It is preferred, however, that at least a very slight clearance exists between the cap 67 and the stem 71 so as to assure that full seating of the one-way valve 54 will be permitted when the main valve 32 is fully seated or closed on its seat 31.

To assure that the main valve 32 is held against its seat under the force exerted by the pressure dome charge, the piston 61, initially in its uppermost position against the snap ring 63, will be urged downwardly against the bias of the spring 66, thereby placing a pressure load within the chamber 52 and against the inside of the bellows 48. The pressure loading of the chamber 52 will compensate for the slight compression factor of the fluid contained therein and will cause the bellows 48 to flex outwardly. However, before the bellows distorts beyond its design limits, the piston 61 will engage the shoulder 64 to prevent further and excessive bellows distortion to a point wherein its sensitivity would be reduced by taking on a permanent set.

It will be appreciated that the amount of distortion of bellows 48 is determined by the permitted travel of piston 61.

When the string is run in the hole, and of course when the casing tubing annulus is subjected to pressure, this pressure will be effective on the main valve member and on the bellows 48. As this pressure in the chamber 50 increases, the bellows 48 will be returned to its undistorted condition and the piston 61 returned to its uppermost position as shown in FIGURE 3. After the pressure in chamber 50 exceeds the pressure within the bellows in chamber 52, no further distortion of the bellows occurs as the liquid in chamber 52 is trapped and sets up a reaction pressure substantially equal to the pressure in chamber 50. It will be appreciated that this reaction pressure in chamber 52 acts downwardly on the main valve to hold it firmly against its seat because the effective area of the bellows 48 is greater than the effective area of the main valve member exposed to casing pressure; it being understood that the valve guide on the lower end of the main valve member 32 is exposed to tubing pressure.

When gas-lift operations are begun, the casing pressure will be increased up to a value which will cause opening of the valve. As the upward force exerted by the pressure in chamber 52 equals the downward force exerted by dome pressure in dome 39 and the force of spring 69, the one-way valve 54 will be in equilibrium. Any greater increase in casing pressure and pressure within chamber 50 will result in unseating of the one-way valve 54 and a release of fluid from chamber 52 so that the downward force acting on the main valve will never exceed the combined force exerted by dome pressure and spring 69. Thus, as casing pressure is increased beyond this amount, the downward force exerted by fluid in chamber 52 remains constant while the upward force on the main valve member increases to such a degree that the main valve member is moved upwardly to open position.

As the main valve member 32 begins its upward movement, the stem 71 contacts the lower end of the one-way valve 54 and mechanically moves it to full open position to insure complete communication between the bellows chamber 52 and the dome chamber 39. This feature will prevent the premature seating of the one-way valve 54 when the valve closes and make certain that the main valve has returned almost to fully seated position before the one-way valve seats. The slight additional movement of the main valve downwardly after the one-way valve 54 seats is permitted without pulling a vacuum in chamber 52 by slight downward movement of piston 61.

Once the one-way valve 54 has been hydraulically unseated and stem 71 mechanically held open by bellows guide 46, the pressure within the dome 39 and within the bellows 48 will equalize and the bellows pressure will be that of the original dome charge.

At the completion of the lifting cycle, the casing pressure drops and the force acting upwardly on the main valve due to this pressure is less than the force exerted by dome pressure, and the valve begins to close. The spring 69 insures that the one-way valve 54 follows the main valve 32 as it moves to closed position. Just before the main valve reaches closed position, the one-way valve 54 seats, and thereafter the main valve moves the remaining distance to seated position alone. At the time that the main valve seats the pressure inside of the bellows chamber 52 is equal to the pressure in chamber 50 plus the extra pressure imposed by the travel of piston 61.

As pointed out hereinabove, when the main valve moves to fully open position, the seal ring 73 engages seat 74 and limits the amount of pressure which can be supplied to chamber 50. Thus, no matter how high the casing pressure is raised, the bellows 48 is protected against excess casing pressure.

When the string is pulled from the well so that the valve is again subjected to atmospheric pressure, the piston 61 will seat on shoulder 64, and thereafter minute expansion of bellows 48 will relieve the pressure of the liquid 52 so that substantially no differential will be exerted across the bellows.

Figure 5:
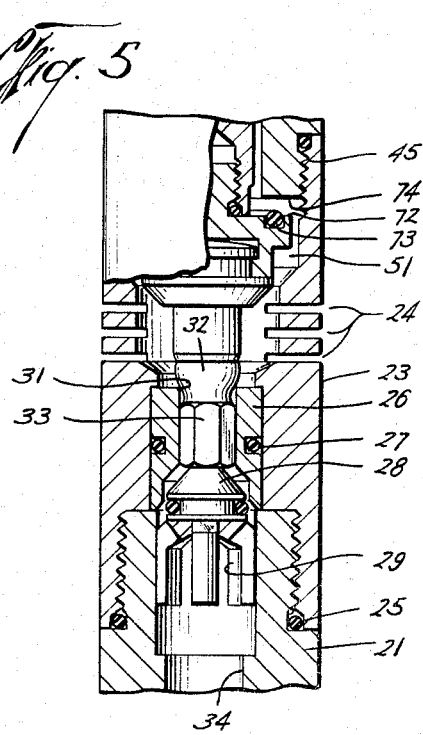
FIGURE 5 is a fragmentary cross-sectional view of an alternative form of pressure responsive valve in accordance with the present invention.

By reference to FIGURE 5 it will be seen that the check valve 28 cannot close when the main valve 32 is seated as the guide 33 holds the check valve off its seat. This insures that the main valve will be tubing pressure sensitive and the main valve will only open when tubing fluid is present at the main valve. Otherwise it would be possible for the main valve to open with no liquid in the tubing resulting in a loss of lifting gas.

The foregoing disclosure and description of the invention is illustrative and explanatory thereof and various changes in the size, shape and materials, as well as in the details of the illustrated construction, may be made within the scope of the appended claims without departing from the spirit of the invention.

The invention claimed is:
1. A pressure responsive valve comprising:
a hollow housing having inlet and outlet ports;
a main valve and seat in said housing for controlling passage of fluid between said inlet and outlet ports;
means defining a pressure dome in said housing for containing expansible fluid under pressure;
and means responsive to a differential between dome pressure and inlet fluid pressure for actuating said main valve, said last-mentioned means including a bellows connected to be in sealing engagement with said main valve and in sealing engagement with the housing to define a first chamber exposable to inlet fluid pressure and a second chamber adjacent to said pressure dome, said housing having a passageway between said pressure dome and said second chamber, one-way valve means in said passageway seatable in the direction of said second chamber to close said passageway, said one-way valve means having an opening therethrough extending to be in communication with both said pressure dome and said second chamber and a pressure-transmitting device movable to a limited extent in said opening, spring means in said dome for biasing said one-way valve means toward seating, stem means extending from said main valve and terminating in an abutment end spaced from said one-way valve means to provide a gap preventing direct mechanical connection between said main valve and said one-way valve when both are fully seated, said second chamber and at least a portion of said passageway being filled with incompressible fluid.

2. A pressure-responsive valve comprising,
a hollow housing,
a main valve for controlling the passage of fluid between inlet and outlet ports,
a pressure dome,
a flexible expansible chamber type fluid motor sensitive to a differential in dome pressure and inlet fluid pressure for actuating the main valve, the motor defining a sealed chamber adapted to communicate with the pressure dome,
an incompressible fluid filing said sealed chamber,
a valve passage in the housing between the pressure dome and the sealed chamber, a one-way valve in said passage seatable by dome pressure in the direction of the sealed chamber,
and means between the pressure dome and sealed chamber for transmitting partial dome pressure to the fluid in the sealed chamber in an amount selected to be less than that which will damage the motor.

3. The valve of claim 2 wherein a guide is carried by and depends from the main valve member, and a check valve member and seat is provided downstream of the main valve, said stem preventing said check valve from seating when said main valve is closed.

4. A pressure responsive valve comprising,
a hollow housing,
a main valve for controlling the passage of fluid between inlet and outlet ports,
a pressure dome,
a bellows sensitive to a differential in dome pressure and inlet fluid pressure for actuating the main valve, the bellows defining a sealed chamber filled with incompressible fluid and adapted to communicate with the pressure dome,
a valve passage in the housing between the pressure dome and the bellows,
a one-way valve in said passage seatable by dome pressure in the direction of the bellows-defined chamber below the level of liquid therein,
means between the pressure dome and sealed chamber for transmitting partial dome pressure to the fluid in the sealed chamber in an amount selected to be less than that which will damage the bellows,
means defining a passage for exposing the bellows on the side thereof opposite from the sealed chamber to inlet fluid pressure, and auxiliary valve means carried by the main valve
seatable to close said last-mentioned passage when
the main valve in fully open, thereby isolating the
the bellows from inlet fluid pressures substantially
in excess of dome pressures.

5. A pressure-responsive valve comprising,
a hollow housing having inlet and outlet ports,
a main valve and seat in said housing for controlling
passage of fluid between said inlet and outlet ports,
means defining a pressure dome in said housing for
containing an expansible fluid under pressure,
a distensible bellows connected to be in sealing engagement with said main valve and in sealing engagement with the housing to define a first chamber and a second chamber adjacent to said pressure dome, said housing having a first passage affording communication between said first chamber and the exterior of said housing and a second passage between said pressure dome and said second chamber,
one-way valve means in said second passage operative to restrict transmission of pressure from said pressure dome to said second chamber, said second chamber and at least a portion of said second passage being filled with incompressible fluid,
means between the pressure dome and sealed chamber for transmitting partial dome pressure to the fluid in the sealed chamber in an amount selected to be less than that which will damage the bellows,
stem means extending from said main valve and adapted to abut said one-way valve upon opening movement of said main valve,
and auxiliary valve means carried by said main valve for closing said first passage to isolate said first chamber and said bellows from pressure exterior of the housing when said main valve is fully opened.

6. A pressure responsive valve comprising,
a hollow housing having inlet and outlet ports,
a main valve and seat in said housing for controlling passage of fluid between said inlet and outlet ports,
means defining a pressure dome in said housing for containing an expansible fluid under preessure,
a distensible bellows connected to be in sealing engagement with said main valve and in sealing engagement with the housing to define a first chamber and a second chamber adjacent to said pressure dome, said housing having a first passage affording communication between said first chamber and the exterior of said housing and a second passage between said pressure dome and said second chamber,
one-way valve means in said second passage operative to restrict transmission of pressure from said pressure dome to said second chamber, said one-way valve means having a bore therethrough and a piston slidable for limited movement in said bore and biased toward said pressure dome, said second chamber and at least a portion of said second passage being filled with incompressible fluid,
stem means extending from said main valve and adapted to abut said one-way valve upon opening movement of said main valve,
and auxiliary valve means carried by said main valve for closing said first passage to isolate said first chamber and said bellows from pressure exterior of said housing when said main valve is fully opened.

7. A pressure responsive valve comprising,
a hollow housing having inlet and outlet ports,
a main valve and seat in said housing for controlling passage of fluid between said inlet and outlet ports,
means defining a pressure dome in said housing for containing an expansible fluid under pressure,
a distensible bellows connected to be in sealing engagement with said main valve and in sealing engagement with the housing to define a first chamber and a second chamber adjacent to said pressure dome, said housing having a first passage affording communication between said first chamber and the exterior of said housing and a second passage between said pressure dome and said second chamber,
one-way valve means in said second passage operative to restrict transmission of pressure from said pressure dome to said second chamber, said second chamber and at least a portion of said second passage being filled with incompressible fluid,
means between the pressure dome and sealed chamber for transmitting partial dome pressure to the fluid in the sealed chamber in an amount selected to be less than that which will damage the bellows,
spring means in said pressure dome for mechanically seating said one-way valve means,
stem means extending from said main valve and adapted to abut said one-way valve upon opening movement of said main valve,
and auxiliary valve means carried by said main valve for closing said first passage to isolate said first chamber and said bellows from pressure exterior of said housing when said main valve is fully opened.

8. A pressure-responsive valve comprising,
a hollow housing having inlet and outlet ports,
a main valve and seat in said housing for controlling passage of fluid between said inlet and outlet ports,
means defining a pressure dome in said housing for containing an expansible fluid under pressure,
a distensible bellows connected to be in sealing engagement with said main valve and in sealing engagement with the housing to define a first chamber and a second chamber adjacent to said pressure dome, said housing having a first passage affording communication between said first chamber and the exterior of said housing and a second passage between said pressure dome and said second chamber,
one-way valve means in said second passage operative to restrict transmission of pressure from said pressure dome to said second chamber, said second chamber and at least a portion of said second passage being filled with incompressible fluid,
means between the pressure dome and sealed chamber for transmitting partial dome pressure to the fluid in the sealed chamber in an amount selected to be less than that which will damage the bellows,
stem means extending from said main valve and adapted to abut said one-way valve upon opening movement of said main valve,
means for adjusting the clearance between said stem means and said one-way valve means,
and auxiliary valve means carried by said main valve for closing said first passage to isolate said first chamber and said bellows from pressure exterior of the housing when said main valve is fully opened.

9. A pressure-responsive valve comprising,
a hollow housing having inlet and outlet ports,
a main valve and seat in said housing for controlling passage of fluid between said inlet and outlet ports,
means defining a pressure dome in said housing for containing expansible fluid under pressure,
and flexible expansible chamber type fluid motor means responsive to a differential between dome pressure and inlet fluid pressure for actuating said main valve, said last-mentioned means including a fluid pressure responsive barrier device movable, at least in part, with said main valve and in sealing engagement with the housing to define a first chamber exposable to inlet fluid pressure and a second chamber adjacent to said pressure dome, said housing having a passageway between said pressure dome and said second chamber, one-way valve means in said passageway seatable in the direction of said second chamber to close said passageway, said one-way valve means having an opening therethrough extending to be in communication with both said pressure dome and said second chamber and a pressure-transmitting device movable to a limited extent in said opening, spring means in said dome for biasing said one-way valve means toward seating, stem means extending from said main valve and terminating in an abutment end spaced from said one-way valve means to provide a gap preventing direct mechanical connection between said main valve and said one-way valve when both are fully seated, said second chamber and at least a portion of said passageway being filled with incompressible fluid.

10. A pressure-responsive valve comprising,
a hollow housing,
a main valve for controlling the passage of fluid between inlet and outlet ports in the housing,
a pressure dome,
motor means sensitive to a differential in dome pressure and inlet fluid pressure for actuating the main valve,
said motor means defining a sealed chamber,
a valve passage in the housing between the pressure dome and the sealed chamber,
a one-way valve in said passage seatable by dome pressure in the direction of the sealed chamber,
and means between the pressure dome and sealed chamber for transmitting a selected amount of dome pressure to the sealed chamber.

11. A pressure-responsive valve comprising,
a hollow housing,
a main valve for controlling the passage of fluid between inlet and outlet ports in the housing,
a pressure dome,
motor means sensitive to a differential in dome pressure and inlet fluid pressure for actuating the main valve,
said motor means defining a sealed chamber,
a valve passage in the housing between the pressure dome and the sealed chamber,
a one-way valve in said passage seatable by dome pressure in the direction of the sealed chamber,
means between the pressure dome and sealed chamber for transmitting a selected amount of dome pressure to the sealed chamber,
and stem means extending from said main valve and adapted to abut said one-way valve upon opening movement of said main valve.

References Cited by the Examiner
UNITED STATES PATENTS

| | | | |
|---|---|---|---|
| 2,519,242 | 8/50 | Garrett | 92—43 XR |
| 2,761,465 | 9/56 | Garrett | 137—155 |
| 2,837,108 | 6/58 | Howard | 137—155 |

WILLIAM F. O'DEA, *Primary Examiner.*

ISADOR WEIL, *Examiner.*